United States Patent
Mizuno et al.

(10) Patent No.: US 9,821,683 B2
(45) Date of Patent: Nov. 21, 2017

(54) EASY SEAT POSITIONING AND INSTALLATION

(71) Applicant: AISIN TECHNICAL CENTER OF AMERICA, INC., Northville, MI (US)

(72) Inventors: Ryosuke Mizuno, Novi, MI (US); Michael Mixon, Plymouth, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 40 days.

(21) Appl. No.: 14/720,452

(22) Filed: May 22, 2015

(65) Prior Publication Data

US 2016/0339807 A1 Nov. 24, 2016

(51) Int. Cl.
*B60N 2/06* (2006.01)
*B60N 2/01* (2006.01)
*B60N 2/07* (2006.01)
*B60N 2/08* (2006.01)
*B60N 2/30* (2006.01)

(52) U.S. Cl.
CPC ............... *B60N 2/062* (2013.01); *B60N 2/01* (2013.01); *B60N 2/0715* (2013.01); *B60N 2/0825* (2013.01); *B60N 2/0843* (2013.01); *B60N 2/3045* (2013.01)

(58) Field of Classification Search
CPC .. B60N 2/062; B60N 2/01583; B60N 2/0155; B60N 2/0881; B60N 2/0825; B60N 2/0715
USPC .......................... 297/344.1; 296/65.11, 65.03
See application file for complete search history.

(56) References Cited

U.S. PATENT DOCUMENTS

| | | | | |
|---|---|---|---|---|
| 3,718,365 A | * | 2/1973 | Gibson | B63B 29/04 114/363 |
| 5,039,155 A | | 8/1991 | Suman et al. | |
| 5,562,322 A | | 10/1996 | Christoffel | |
| 5,906,345 A | * | 5/1999 | Frey | B60N 2/01583 248/200 |
| 6,129,405 A | * | 10/2000 | Miyahara | B60N 2/01 296/65.03 |
| 6,609,745 B2 | | 8/2003 | Miyahara et al. | |
| 6,955,386 B2 | | 10/2005 | Rhodes et al. | |
| 8,079,564 B2 | * | 12/2011 | Martel | B60N 2/0875 248/429 |

(Continued)

FOREIGN PATENT DOCUMENTS

DE 2753307 A1 * 5/1979 ........... B60N 2/0155
DE 102004017138 A1 * 10/2005 ............. B60N 2/062

(Continued)

OTHER PUBLICATIONS

Office Action dated Mar. 28, 2017 in Japanese Patent Application No. 2016-071453 (with English Translation).

*Primary Examiner* — Milton Nelson, Jr.
(74) *Attorney, Agent, or Firm* — Oblon, McClelland, Maier & Neustadt, L.L.P.

(57) ABSTRACT

A seat mounting apparatus of a vehicle, including a plurality of seat tracks mounted in the vehicle; a plurality of seat sliders at least equal in number to a number of the plurality of seat tracks, each of the plurality of seat sliders being slidable along one of the plurality of seat tracks; and a seat mounting bracket that aligns and fixes a relative position in the direction of a number of the plurality of seat sliders equal to the number of the plurality of seat tracks.

5 Claims, 8 Drawing Sheets

(56) References Cited

U.S. PATENT DOCUMENTS 8,763,975 B2 * 7/2014 Garotte ............... B60N 2/0881
248/424

FOREIGN PATENT DOCUMENTS

| JP | H 09-058311 A | 3/1997 | | |
|---|---|---|---|---|
| JP | H 10-324181 A | 12/1998 | | |
| JP | H 11-245695 A | 9/1999 | | |
| JP | 3696709 B2 * | 9/2005 | ............. | B60N 2/062 |

* cited by examiner

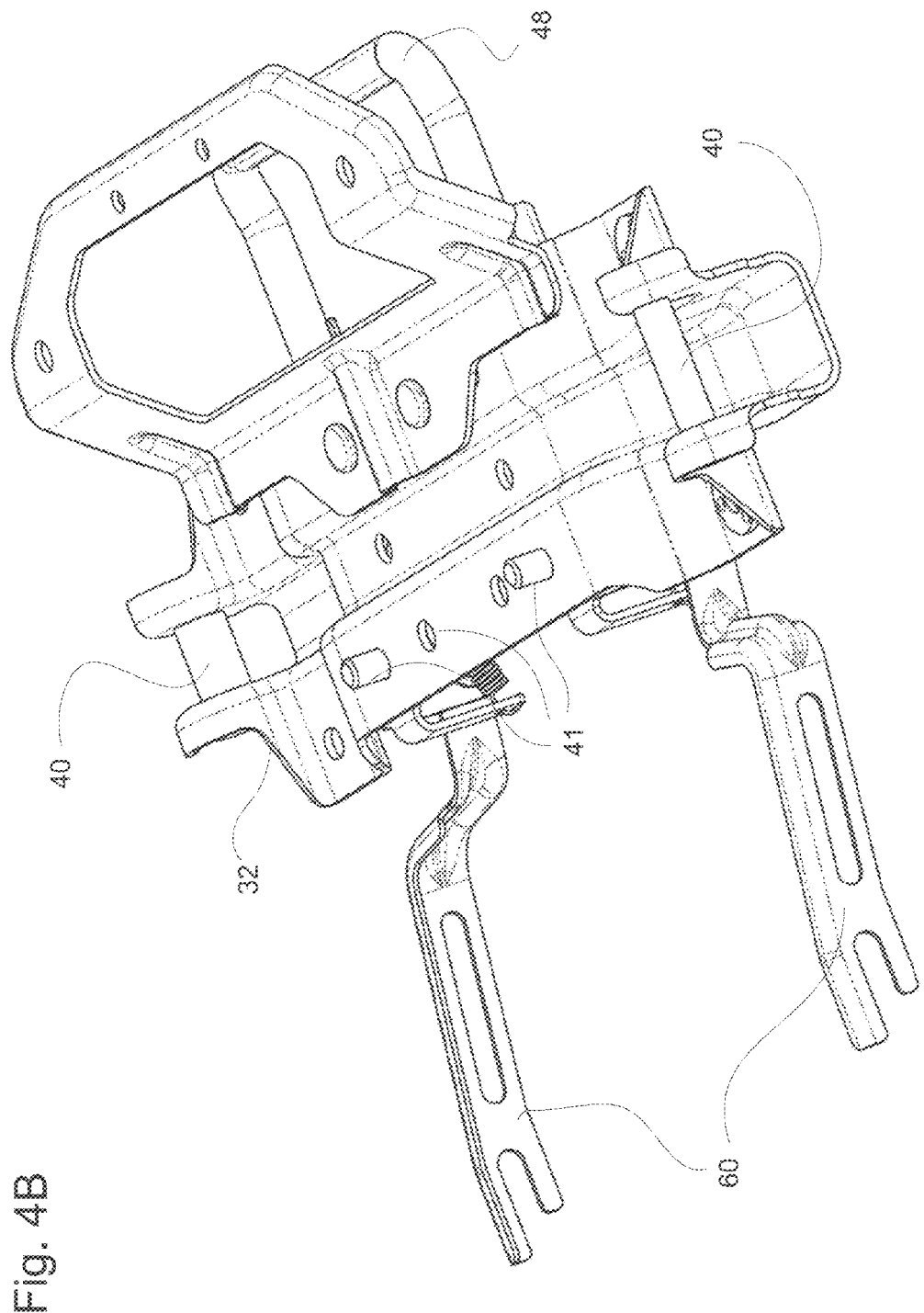

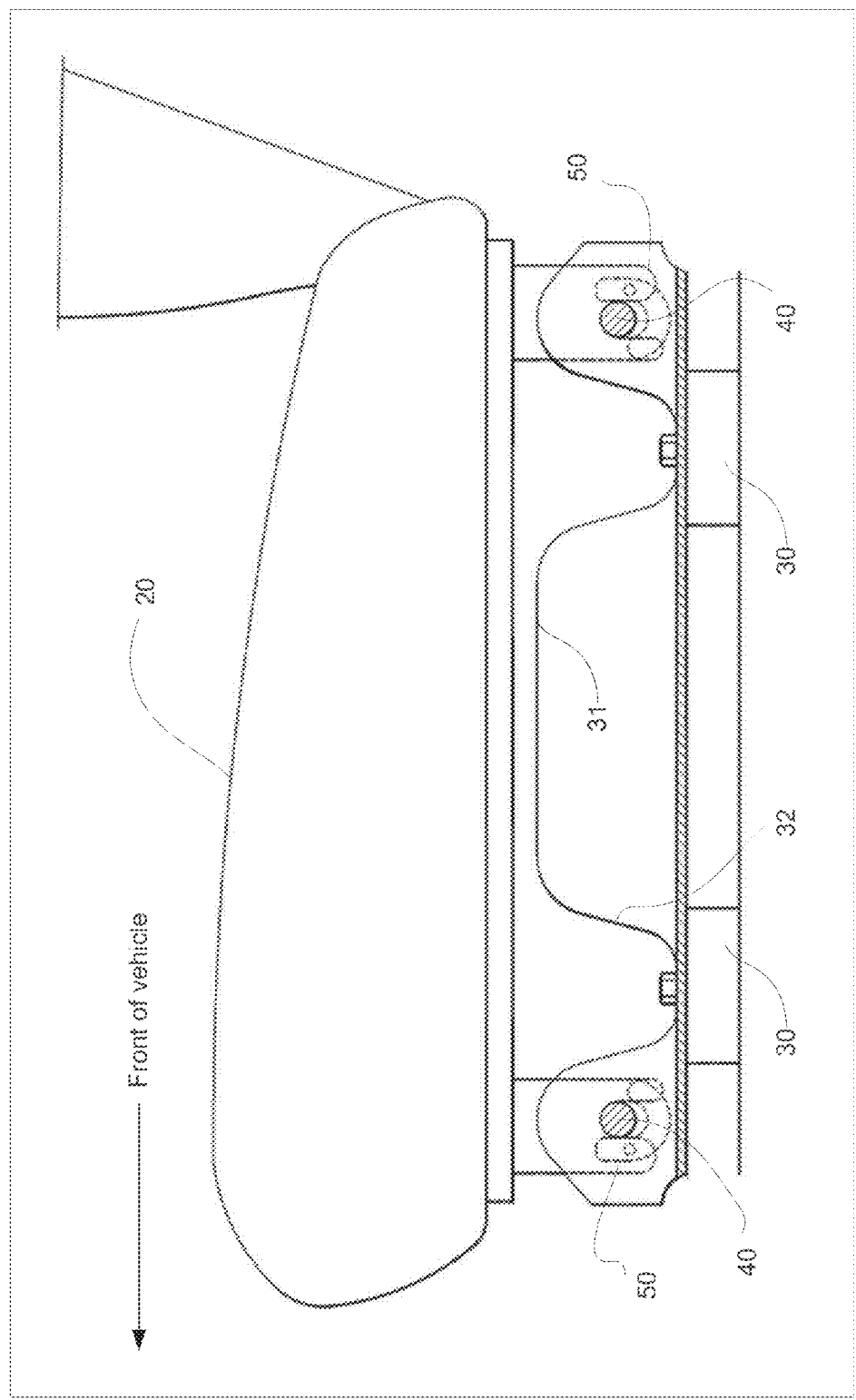

EASY SEAT POSITIONING AND INSTALLATION

BACKGROUND

Field of the Disclosure

The present disclosure is related to techniques and apparatus for removable vehicle seats. More particularly, embodiments may enable easy alignment of separate seat rails and sliders along a particular direction or axis of movement.

Description of the Related Art

Vehicle seat location adjustment, whether for bench seats or bucket-type seats, is typically a fore/aft adjustment along the longitudinal vehicle direction to accommodate drivers and passengers of varying heights.

These adjustments can consist of a pair of parallel seat tracks underneath the seat upon which the entire seat assembly slides. These tracks are installed at the time of manufacture and no further seat removal or installation is anticipated for the life of the vehicle. Therefore, no provisions are made for such procedures.

Multi-passenger vehicles such as vans, minivans and SUVs, vehicle manufacturers may have seating arrangements that are also reconfigurable in a multitude of ways. The arrangements evolved from basic, fixed location seats for rows behind that of the driver's seat, to those with folding and removable seats.

These features enable flexible seating configurations, such as the removal or repositioning of the back and/or middle row(s) of seats to increase cargo capacity in vehicles with multiple rows of seats. Further, this allow for the removal of particular seating positions in vehicles equipped with individual seats, whether by removal from the vehicle or folding to a different position, such as flat into the vehicle's floor, providing further flexible seating and hauling configurations to accommodate a wide variety of uses.

Removable seats that are also laterally adjustable were developed, as disclosed by U.S. Pat. No. 6,609,745 (Miyahara, et al). These seats allow for reconfiguration of seating arrangements in additional ways.

While the disclosure of U.S. Pat. No. 6,609,745 indicates the distance between the front and rear lateral slide rails are fixed for each row of seats, U.S. Pat. No. 6,609,745 does not disclose positioning and securing the front and rear seat rails for each seat assembly relative to one another in the lateral direction, transverse to a vehicle's longitudinal direction.

Seat removal, where a seat assembly is separated from the seat tracks completely, leaves the seat sliders independent of one another, not attached to a common or shared component such as the seat frame. This presents a unique problem when installing the seats.

Seat slider alignment does not tend to arise with adjustment in the longitudinal direction of the vehicle because mechanisms used in those designs are usually built into the seat and not separated from the seat during use or adjustment.

As such, the seat sliders in laterally adjustable seats require additional adjustment so that they are sufficiently aligned relative to one another in the lateral direction prior to installation of each seat assembly, even if the seat slider positions vary only slightly from one another in the lateral direction. Otherwise the installation process can become cumbersome, difficult, and potentially result in seats not correctly installed.

SUMMARY

The disclosure pertains to techniques and apparatus which easily align seat sliders on separate, independent seat tracks designed for use with removable vehicle seats and seating systems. Removable seats can present installation challenges due to the need to separate and combine independent seats and seating assemblies.

Use of these techniques and apparatus enable consistent alignment of seating components, reduce the number of user operations involving the handling of the full mass and bulk of seating system components, and provide flexible seating arrangements and configurations in vehicles equipped with such seating systems.

BRIEF DESCRIPTION OF THE DRAWINGS

FIG. 4B is a perspective view of a seat mounting bracket affixed to an operating handle assembly, according to certain aspects of the disclosure;

FIG. 5 is a profile view of a seat installed on a seat mounting bracket by means of seat strikers, according to certain aspects of the disclosure;

DETAILED DESCRIPTION OF THE EMBODIMENTS

Figure 1:
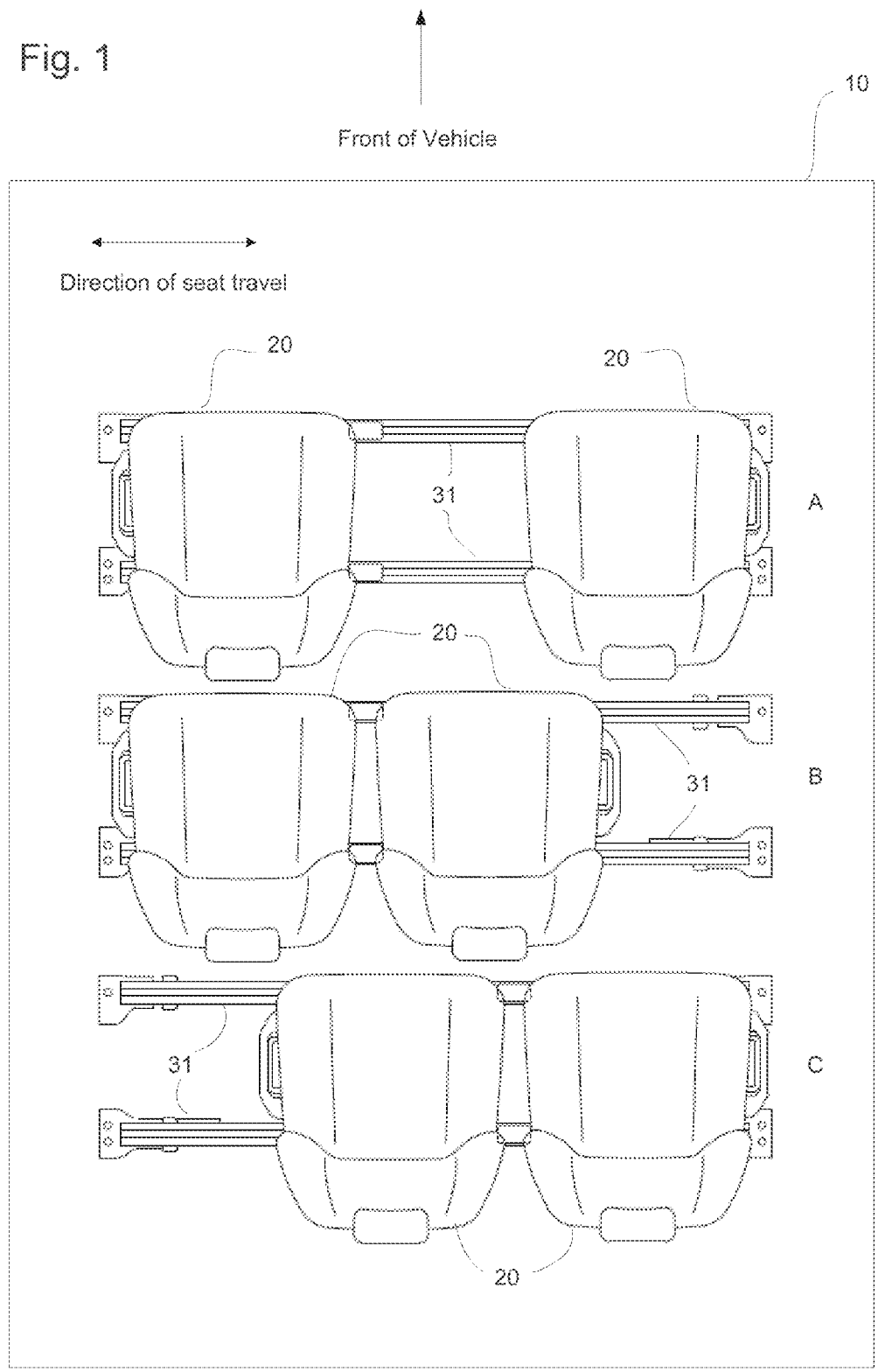
FIG. 1 is a plan view of rows of seats in a cabin of a vehicle to which the present disclosure is applied, according to certain aspects of the disclosure.

What is needed is a way to maintain the relative distance between a pair of transversely mounted seat sliders prior to seat installation, to ensure an easy and precise installation process. A system is provided to align independent front and rear seat sliders prior to installation of each seat or seat bench, regardless of the position of the seat sliders within their lateral range of movement along their respective seat tracks.

The terms "seat", "seat assembly", and similar terms generally refer to one or more removable seating positions described in the disclosure.

Referring now to the drawings, wherein like reference numerals designate identical or corresponding parts throughout the several views.

FIG. 1 is a plan view of an embodiment of a cabin of a vehicle 10 to which the present disclosure can be applied. In this embodiment, the vehicle 10 seating arrangement comprises three rows A, B and C, of seats 20, all disposed in the forward facing direction of the vehicle, with row C located behind row B, and row B located behind row A. Each row comprises two seats affixed upon two parallel seat tracks 31, positioned in the lateral direction, orthogonal to the direction parallel to the arrow indicating the front of vehicle 10. The positions of seats or seat assemblies 20 are adjustable along the length of the seat tracks 31. The seats or seat assemblies 20 slide and are secured to the seat tracks 31 at various positions along the seat tracks 31, provided the paths are not obstructed by other seats 20, related mechanisms, or any other object, by way of a number of intermediate apparatus described herein.

The seat sliders 30 (FIG. 3) are mounted upon seat tracks 31 by means of locking mechanisms. Once seating positions are selected, the locking mechanism secures a corresponding pair of two seat sliders, joined by two seat mounting brackets 32 (FIG. 4A), to the two seat tracks 31 upon which they are mounted. Each row of seats or seat assemblies 20 comprises a front and back seat track 31, affixed in parallel to the floor of vehicle 10. Any number of seat tracks 31 could be used to secure a row of seats or seat assemblies 20, each row in this embodiment comprising two seats 20, though a variety of seats 20 can fit, depending on the seat 20 sizes and mounting designs. Seat tracks 31 in alternate embodiments may be oriented to provide seat movement and positioning in other directions, for example in the longitudinal direction parallel to the arrow indicating the front of the vehicle 10, to enable fore and aft seat 20 location adjustment. Seat 20 disposition can be forward facing, such as in this embodiment, or facing backwards or to a side of the vehicle 10. While the embodiments of this disclosure will address seats or seat assemblies 20 disposed in the forward direction, alternate embodiments with provision for seat mounts which enable the seats 20 to swivel are also possible.

Figure 2:
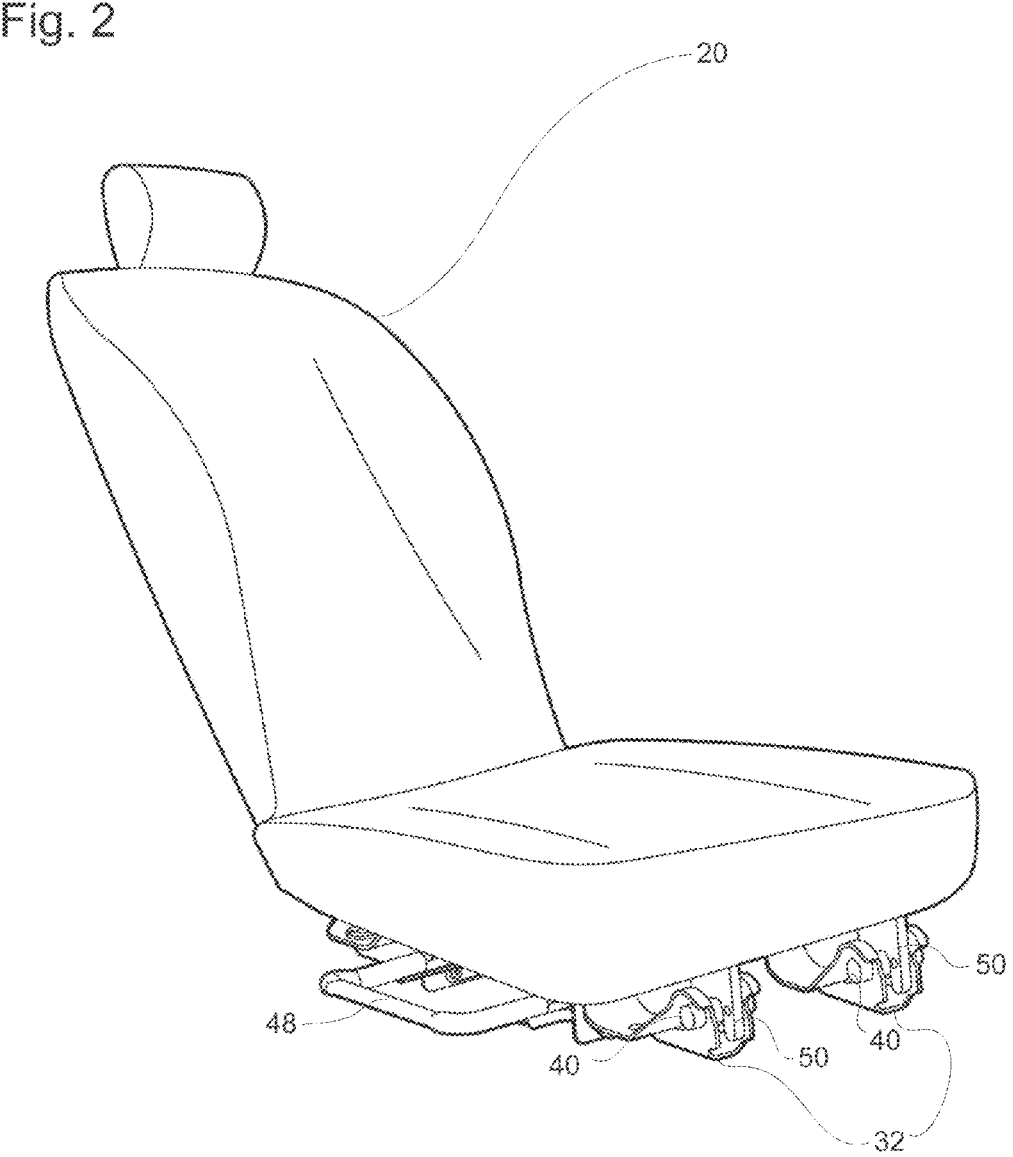
FIG. 2 is a perspective view of a vehicle seat, according to certain aspects of the disclosure.

FIG. 2 is a perspective view of an embodiment of a vehicle seat assembly 20, affixed to two seat mounting brackets 32 underneath the seat assembly 20. The seat assembly 20 has four strikers 50 underneath. Two of the strikers 50 are disposed toward the forward underside of the seat assembly 20, equidistant about the seat assembly's 20 longitudinal centerline from the front edge of the seat cushion to the seatback, and two of the strikers 50 are disposed toward the rear underside of the seat assembly 20, equidistant about the seat assembly's 20 longitudinal centerline from the front edge of the seat cushion to the seatback. The strikers 50 each engage one of two seat mounting brackets 32 by engaging two striker mounts 40, for example, a pin, dowel, or journal disposed in a lateral, horizontal position, integral to each seat mounting bracket 32.

Each seat mounting bracket 32 attaches to one side of the underside of the seat assembly 20 through engagement between one front and one rear striker mount 40 on the seat mounting bracket 32, and two corresponding strikers 50 of the seat assembly 20. The position of the seat 20 within the vehicle 10 is independently adjustable along the lateral direction of the vehicle 10 defined by the length of the seat tracks 31. The lateral position of each seat or seat assembly 20 along the seat tracks 31 may be adjusted using an operating handle assembly 48, as described further in FIG. 4B, to release its movement along the length of the seat tracks 31. This adjustment may be independent of other adjustment features the seat assembly 20 may possess, for example reclining the seatback, or adjusting the height, fore/aft, and tilt positions of the seat assembly 20.

Figure 3:
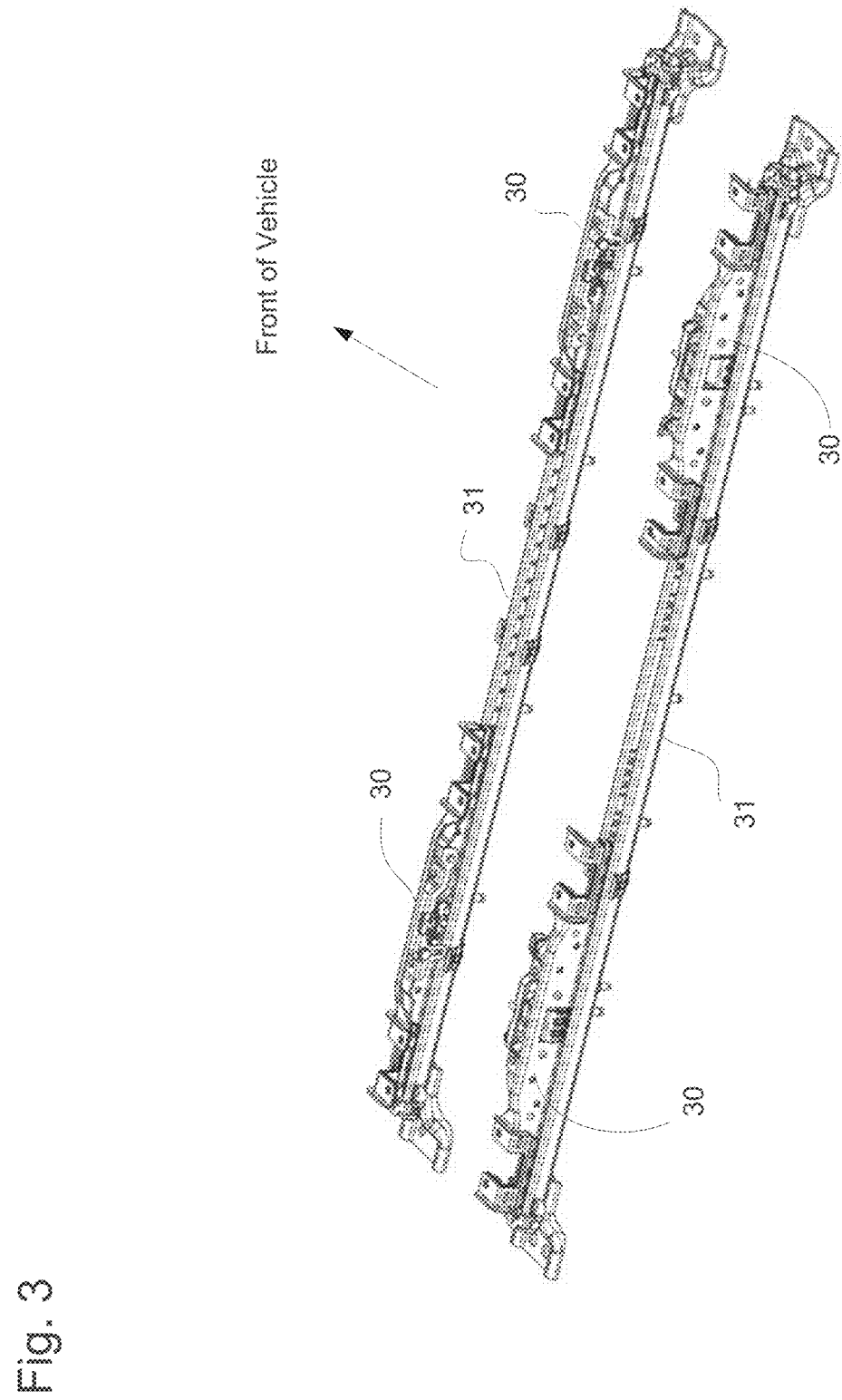
FIG. 3 is a perspective view of a pair of seat tracks mounted across the width of a vehicle, according to certain aspects of the disclosure.

FIG. 3 is a perspective view of an embodiment of a pair of seat tracks 31 mounted in parallel along the lateral direction of the vehicle 10, orthogonal to the longitudinal axis of the vehicle 10, and secured to the vehicle 10 floor at multiple points by, for example, bolts, dowels, welds, and/or other mechanisms. Seat tracks 31 are arranged in pairs of two to support the placement of the front and rear of each seat assembly 20 and seat mounting brackets 32, though it is possible in other embodiments to use more or fewer seat tracks 31, for example, one or three. One or more seat sliders 30 are located on or within each seat track 31. Each seat track 31 provides a guided path by which the seat sliders 30 can move along the transverse axis of the vehicle 10. The transverse movement of each seat slider 30 occurs by a sliding action, for example, facilitated by bearings or wheels, with or without the aid of lubrication. The seat sliders 30 on each seat track 31 are positioned independently of the seat sliders 30 of the corresponding seat track 31. Each seat slider 30 is moveable in the lateral direction along the length of the seat track 31 as far as its path on the seat track 31 is unobstructed by another seat 20 (FIG. 2), seat slider 30, or other object.

Each seat slider 30 has mounts to support one end of each of two seat mounting brackets 32. Seat sliders 30 must be aligned such that seat mounting brackets 32 can attach to corresponding seat slider 30 positions on a pair of two parallel seat tracks 31 to maintain the relative position of a pair of two seat sliders 30 and provide a dimensionally consistent mounting platform for seat assemblies 20. Seat mounting brackets 32 attach to seat sliders 30 in a way which entails either more than one fastener or joint at each mounting point, or also with special design elements, for example, tongues, grooves and channels, to create rigid joints such that when a corresponding pair of two seat sliders 30 is joined by a pair of two seat mounting brackets 32, the entire assembly maintains its rigidity and geometry. Otherwise, there is still a possibility of misalignment that could result in the seat mounting brackets 32 not being able to accurately support the seat assembly 20.

A pair of two seat sliders 30 located on a pair of two corresponding seat tracks 31 support a seat assembly 20 via a pair of two seat mounting brackets 32 that span the two seat tracks 31, with each end of each seat mounting bracket 32 joining one end of a seat slider 30. The mounting points on each seat slider 30 enable the installation of seat mounting brackets 32, and for the seat assembly 20 affixed to each seat mounting bracket 32, as described by FIG. 2, to move along the path of the seat tracks 31 in conjunction with the respective seat sliders 30 on the corresponding seat track 31 which shares the seat assembly 20. The mounting points on each seat slider 30 enable the installation of seat mounting brackets 32, and for seat assemblies 20 affixed to seat mounting brackets 32 and each seat slider 30 to move transversely within the vehicle 10 along the paths of the seat tracks 31. The path along the seat tracks 31 are free, limited then by the length of the seat tracks 31, additional seat assemblies 20, or latches, detents, ratchets, or other securement devices to prevent unintended or undesired movement of the seat assemblies 20 along the direction of the seat tracks 31.

Figure 4A:
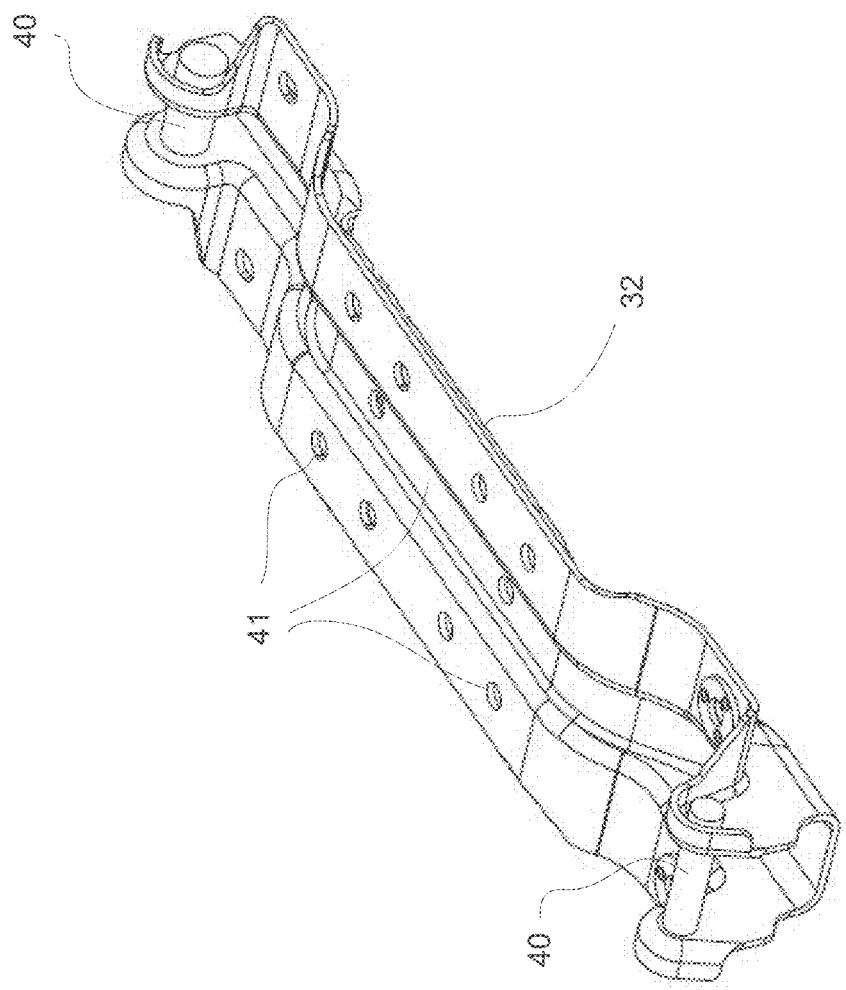
FIG. 4A is a perspective view of a seat mounting bracket, according to certain aspects of the disclosure.

FIG. 4A is a perspective view of an embodiment of a seat mounting bracket 32. The seat mounting bracket 32 includes a striker mount 40 at each end, disposed horizontally along the width of the bracket, for the placement of seat strikers 50 (FIG. 5) attached to the bottom of each seat assembly 20 (FIG. 2). The seat mounting bracket 32 may be constructed in such a way with, for example, channels, grooves, or other design elements, to help secure a seat assembly 20 during installation and removal, and to prevent movement by having a plurality of locating guides 41 to help with placement of the corresponding hardware mounted to the bottom of the seat assembly 20 for ease of positioning during seat installation, and to maintain the seat's 20 lateral and longitudinal position relative to the seat mounting bracket 32 once in place. The seat mounting bracket 32 improves installation accuracy, eliminating the need for readjustment of seat sliders 30 on corresponding seat tracks 31 prior to and during seat assembly 20 installation within the vehicle 10, ensuring accurate seat slider 30 alignment without additional user manipulation.

The attachment of one or more seat mounting brackets 32 per set of seat sliders 30 enhances the rigidity and dimensional accuracy of the system. A plurality of fasteners, mounts and other design elements may be used to securely attach each end of each seat mounting bracket 32 to a seat slider 30. Design elements include, for example, grooves, tongues, channels, and asymmetrically shaped details, and help ensure seat mounting brackets 32 can only attach to seat sliders 30 in a particular way or ways, further restricting fore, aft, and vertical movement of the seat and seat assemblies 20, as well as reducing rotational motion roll, yaw and pitch.

If the seat assembly 20 were mounted directly to the corresponding pair of two seat sliders 30 on a front and rear row of two corresponding seat tracks 31, the seat sliders 30 themselves would serve as a type of seat mounting bracket 32 since the striker mounts 40 and any locating guides 41 would then have to be located on the seat sliders 30. However, because a pair of two corresponding seat sliders 30, which are needed to support a seat or seat assembly 20, are located on separate, parallel seat tracks 31 and independent of one another, they would not be aligned with any consistency, along the length of the seat tracks 31 in which they are located, in a direction along a transverse axis orthogonal to the longitudinal axis of the vehicle 10. Thus, a user installing a seat assembly 20 would have to manually align the corresponding pair of two seat sliders 30 along the transverse vehicle 10 axis each time prior to and during installation of a seat assembly 20, and for each seat assembly 20 position.

Moreover, each time a user installs a seat assembly 20 on an apparatus as described, the number of operations the user must perform to maneuver the seat assembly into position is greater than that of installing a similar seat assembly 20 on a corresponding pair of two seat sliders 30 already secured and linked together by two seat mounting brackets 32, with their positions already aligned. Using seat mounting brackets 32 as disclosed reduces the amount of times the user must manipulate the weight and bulk of a seat assembly 20 during the installation process. Furthermore, with seat mounting brackets 32 already in place, each subsequent time a seat assembly 20 is removed and installed, the seat sliders 30 (FIG. 3) will already be secured together, providing the same benefit of not having to use the seat assembly 20 itself as the apparatus with which to align the front and rear seat sliders 30 for subsequent installations.

FIG. 4B is a perspective view of an embodiment of a seat mounting bracket 32 affixed to an operating handle assembly 48. The seat mounting bracket 32 contains a plurality of striker mounts 40 and locating guides 41 as described in FIG. 4A. Each seating position comprises two seat mounting brackets 32 and requires one of the seat mounting brackets 32 to be equipped with one operating handle assembly 48. The operating handle assembly 48 also comprises a pair of lock bars 60, which pivot with the movement of the operating handle assembly 48.

Each lock bar 60 engages a securement device in the seat slider 30 with which it is in contact. When the operating handle 48 is pulled, the lock bar pivots and disengages the securement device in the seat slider 30 (FIG. 3), allowing the seat slider 30 to freely slide along seat track 31.

FIG. 5 is a profile view of an embodiment of a section of a seat assembly 20 installed on a seat mounting bracket 32. Seat strikers 50 integral to the seat assembly 20 engage corresponding striker mounts 40 integral to the seat mounting bracket 32. The seat mounting bracket 32 mounts to two seat sliders 30, one seat slider 30 disposed toward the front of the vehicle supporting the front of the seat assembly 20, and the other seat slider 30 disposed toward the rear of the vehicle supporting the rear of the seat assembly 20. Each of those seat sliders 30 resides in a seat track 31 (FIG. 3) located directly beneath the respective seat slider 30. The seat mounting bracket 32 is affixed to the seat sliders 30 with, for example, bolts, screws, dowels, or other mechanisms, fixing the relative position of the front and rear seat sliders 30.

Figure 6:
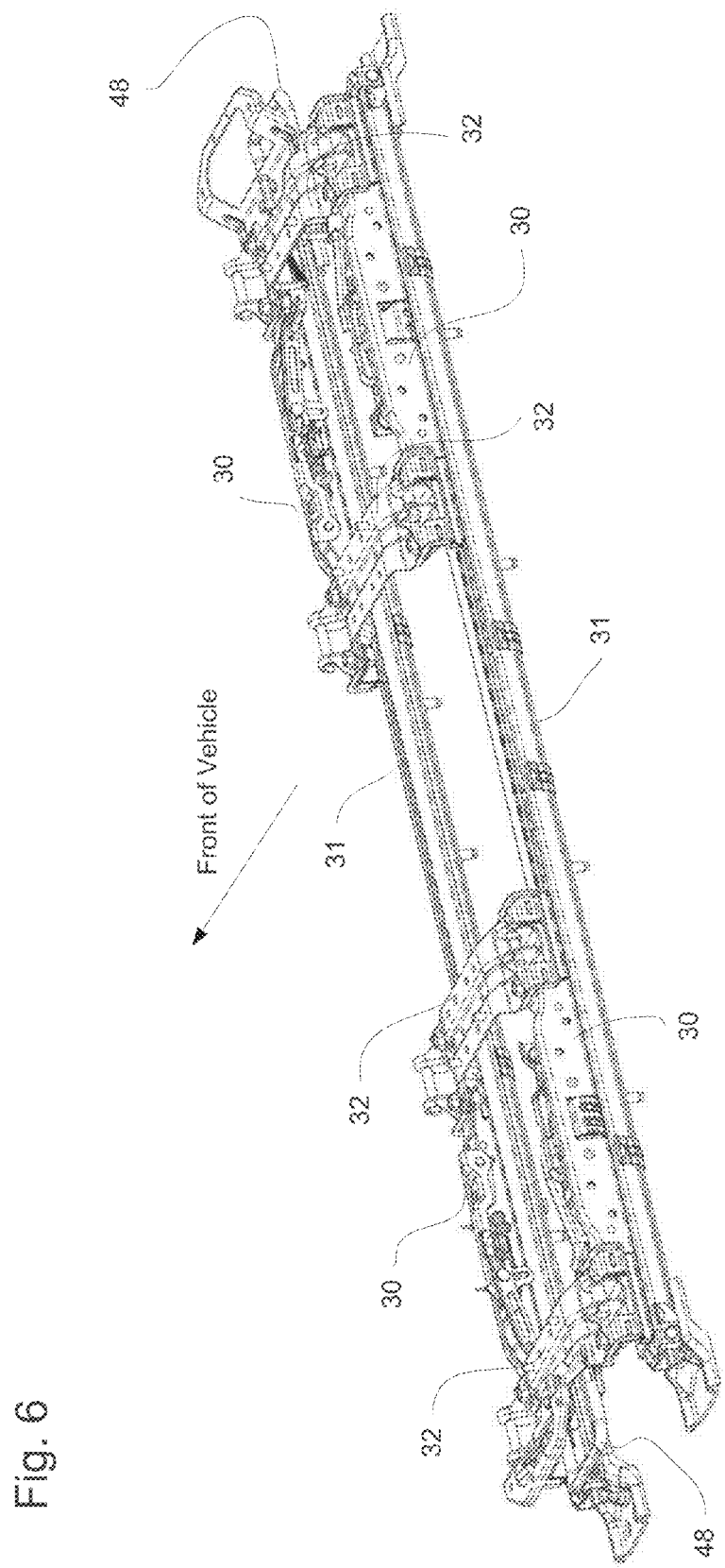
FIG. 6 is a perspective view of the pair of seat tracks of FIG. 3 with four seat mounting brackets of FIG. 4A mounted on the seat sliders, according to certain aspects of the disclosure.

FIG. 6 is a perspective view of an embodiment of a pair of two parallel corresponding seat tracks 31 disposed in an orthogonal manner to the longitudinal axis of the vehicle 10, with one seat track 31 disposed toward the front of the vehicle 10 and one seat track 31 disposed toward the rear of the vehicle. Each seat track 31 contains two independently adjustable seat sliders 30. Each of those seat sliders 30 is affixed to one end of two separate seat mounting brackets 32. Each of those seat mounting brackets spans the distance between the two seat tracks 31 and is affixed at the other end to another seat slider 30.

Figure 7:
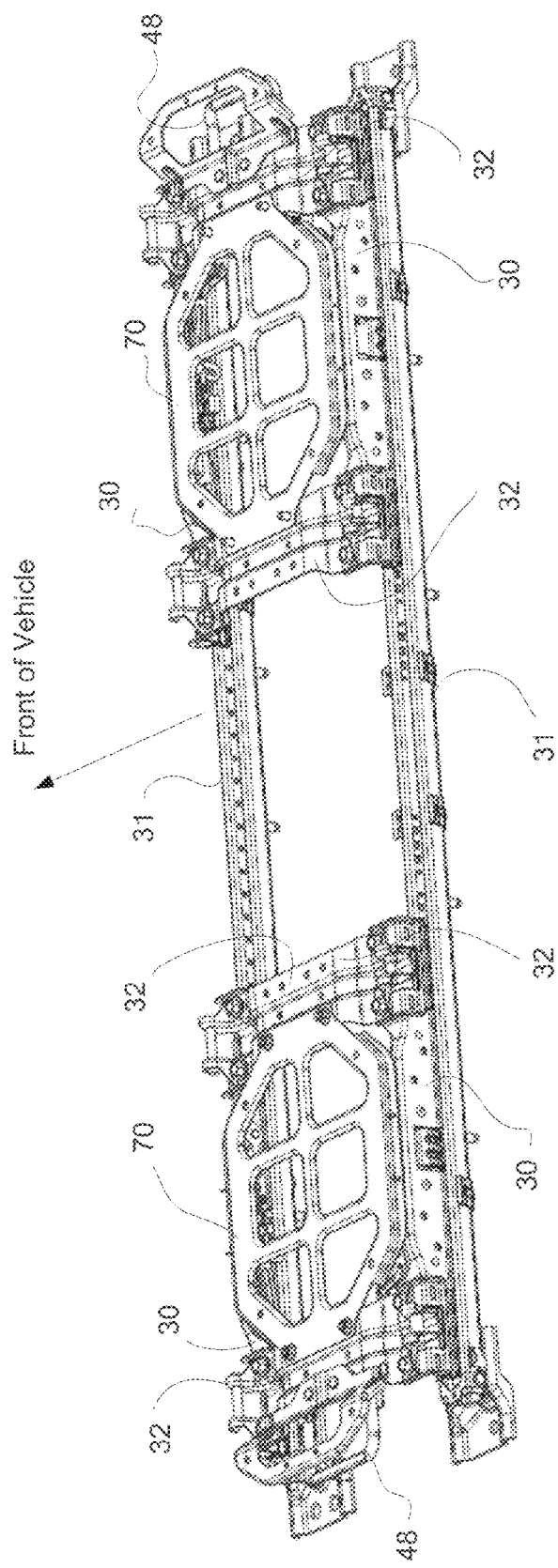
FIG. 7 is a perspective view of the pair of seat tracks of FIG. 3 with four seat mounting brackets of FIG. 4A mounted on the seat sliders, and two crossbrackets mounted on the seat mounting brackets, according to certain aspects of the disclosure.

Furthermore, each pair of seat sliders 30 is joined at one end by an operating handle assembly 48 which attaches to one seat mounting bracket 32 and the two corresponding seat tracks 31, by way of fasteners, for example, screws or bolts. The operating handle assembly 48 engages and disengages a securement mechanism located within the seat sliders 30 which releases or restricts motion between the seat sliders 30 to which the operating handle assembly 48 is affixed and the seat tracks 31 upon which the seat sliders 30 are located. Therefore the pair of two corresponding seat tracks 31 contains two sliding assemblies, each comprising two seat sliders 30, two seat mounting brackets 32, and one operating handle assembly 48. Thus the seat mounting brackets 32 ensure the attached seat sliders 30 are transversely aligned within the vehicle 10, along the length of the seat tracks 31 to provide two platforms upon which seat assemblies 20 (FIG. 2) are mounted, moved and positioned along the pair of two corresponding seat tracks 31. FIG. 7 is a perspective view of an embodiment of a pair of two parallel corresponding seat tracks 31 disposed in an orthogonal manner to the longitudinal axis of the vehicle 10, with one seat track 31 disposed toward the front of the vehicle 10 and one seat track 31 disposed toward the rear of the vehicle. It is identical to that of FIG. 6 with an additional crossbracket 70 affixed to each pair of two seat sliders 30 and each pair of two seat mounting brackets 32, at each seat mounting position. Crossbracket 70 provides additional rigidity and dimensional accuracy for each seat mounting position, and provides additional support for each seat or seat assembly 20 by linking corresponding front and rear seat sliders 30 and both seat mounting brackets 32. Also, secondary functions of the flat plane formed by crossbracket 70 above the seat sliders 30 and seat mounting brackets 32 include as, for example, a parcel shelf, storage area, or footrest for seating positions in a row located behind a given crossbracket 70

Furthermore, while this disclosure includes a number of embodiments related to seat assemblies 20, and seating positions in automobiles, further embodiments could encompass the use of similar systems and apparatus for the purpose of providing flexible and configurable storage and transportation of cargo, or a combination of passengers and cargo, in both automobiles and other vehicles, for example, trucks, motor coaches, aircraft, and marine vessels.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A seat mounting apparatus of a vehicle, comprising:
   a first seat track and a second seat track each mounted in the vehicle;
   a first pair of seat sliders, one of the first pair of seat sliders being slidable on the first seat track and the other of the first pair of seat sliders being slidable on the second seat track;
   a second pair of seat sliders, one of the second pair of seat sliders being slidable on the first seat track and the other of the second pair of seat sliders being slidable on the second seat track;
   a first seat mounting bracket that aligns and fixes a relative position of the first pair of seat sliders in a direction along the first seat track and the second seat track;
   a second seat mounting bracket that aligns and fixes a relative position of the second pair of seat sliders in the direction along the first seat track and the second seat track;
   a first operating handle affixed to the first seat mounting bracket which selectively locks and unlocks the first pair of seat sliders relative to both the first seat track and the second seat track; and
   a second operating handle affixed to the second seat mounting bracket which selectively locks and unlocks the second pair of seat sliders relative to both the first seat track and the second seat track.

2. The seat mounting apparatus of claim 1, wherein the first seat mounting bracket includes a first end and a second end, and a striker mount configured to secure a seat assembly to the first seat track and the second seat track is arranged at the first end and the second end.

3. The seat mounting apparatus of claim 2, wherein the first seat mounting bracket includes a plurality of locating guides to locate hardware on a bottom side of the seat assembly.

4. The seat mounting apparatus of claim 2, further comprising:
   a crossbracket that joins the first seat mounting bracket and the second seat mounting bracket together.

5. The seat mounting apparatus of claim 2, wherein the seat assembly includes a detachable assembly with seat strikers that engage with the striker mount.

* * * * *